S. E. JACOBY AND C. J. EDMONDS.
HEADLIGHT CONTROL.
APPLICATION FILED JUNE 20, 1919.
1,340,771.
Patented May 18, 1920.
2 SHEETS—SHEET 1.
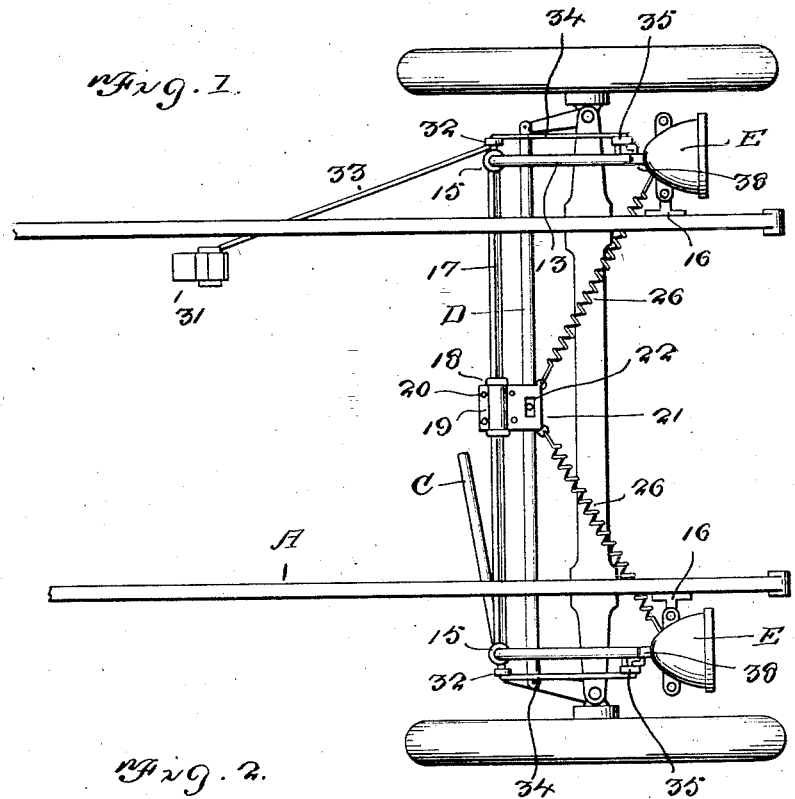
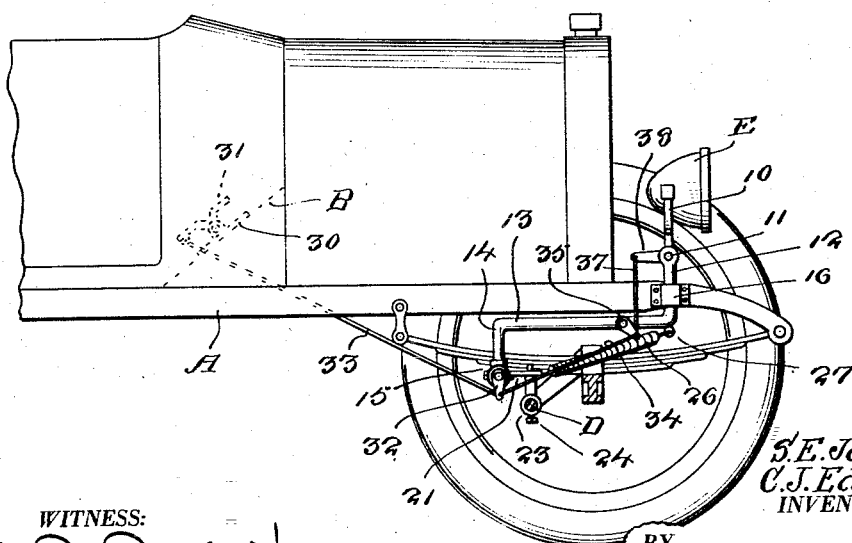
WITNESS:
E. R. Ruppert.
S. E. Jacoby
C. J. Edmonds
INVENTORS.
BY
Victor J. Evans
ATTORNEY.

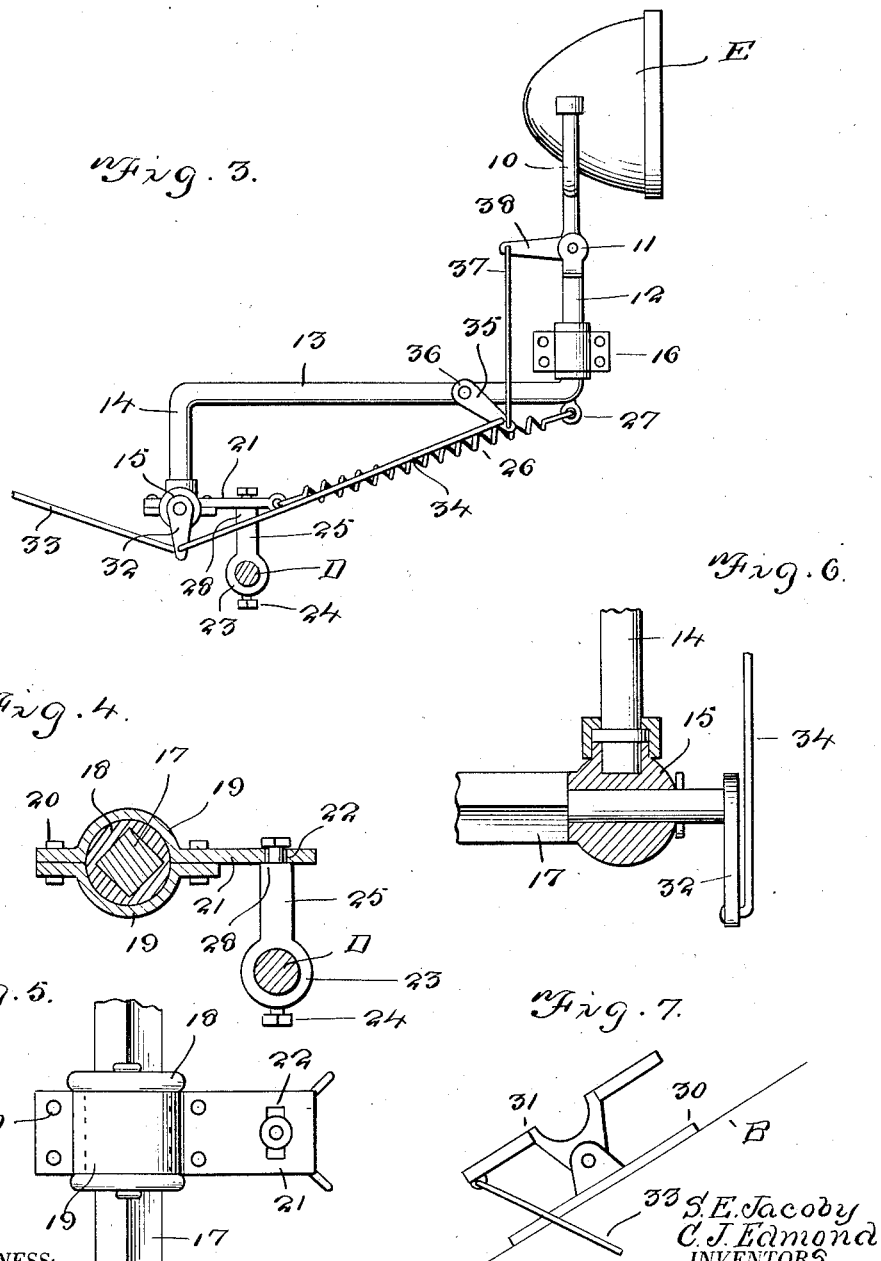

UNITED STATES PATENT OFFICE.

STANLEY E. JACOBY AND CLELAND J. EDMONDS, OF BRIMFIELD, INDIANA.

HEADLIGHT CONTROL.

1,340,771.  Specification of Letters Patent.  Patented May 18, 1920.

Application filed June 20, 1919. Serial No. 305,563.

*To all whom it may concern:*

Be it known that we, STANLEY E. JACOBY and CLELAND J. EDMONDS, citizens of the United States, residing at Brimfield, in the county of Noble and State of Indiana, have invented new and useful Improvements in Headlight Control, of which the following is a specification.

This invention relates to dirigible head lights, particularly to those adapted for use upon automobiles, and has for its object the provision of means positively connected with the steering arm connecting rod of the front wheels of an automobile and operatively connected with supports carrying the head lights, the supports being pivotally connected with the frame, whereby upon steering of the automobile in either direction the head lights will be correspondingly moved so that the rays of light will be thrown onto the roadway always in advance of the vehicle.

An important object is the provision of dirigible head lights having means whereby upon pressure of the driver's foot upon a foot pedal the head lights may be tilted forwardly so that the rays of light will be directed more toward the ground so as to avoid blinding drivers of approaching cars without the necessity of employment of objectionable dimming devices upon the head lights.

Another object is the provision of mechanism of this character which is spring pressed whereby the headlights will be normally maintained in a straight ahead position until positively moved by the automatic or pedal controlled means.

Another object is the provision in a mechanism of this character of means whereby the position of the head lights will be unaffected in the event of slight movement of the front wheels as in following the ruts of a rough road.

An additional object is the provision of a device of this character which will be comparatively simple and inexpensive in manufacture and installation, highly efficient in use, positive in action, durable in service, and a general improvement in the art.

With the above and other objects and advantages in view, the invention consists in the details of construction to be hereinafter more fully described and claimed, and illustrated in the accompanying drawings, in which—

Figure 1 is a plan view of the front portion of an automobile chassis showing our device applied thereto, Fig. 2 is a side elevation showing the device having associated therewith the foot pedal for tilting the head lights forwardly, Fig. 3 is a central longitudinal sectional view, Fig. 4 is a detail sectional view of the parts of the mechanism secured to the steering arm connecting rod, Fig. 5 is a plan view of the parts shown in Fig. 4, Fig. 6 is a detail view, partly in section, of the parts connected with the rear ends of the lamp carrying members, and Fig. 7 is a detail elevation of the foot pedal.

Referring more particularly to the drawings, the letter A designates the side bars of the frame of an automobile, B designates a portion of the floor boards, C designates the steering rod, D designates the steering arm connecting rod, and E designates the head lights.

The head lights E instead of being stationary as in ordinary practice, are carried upon vertical supports 10 which are pivotally connected at their lower ends, as shown at 11, with the upper ends of the vertical arms 12 of angular supporting members 13 provided at their rear ends with downwardly extending vertical portions 14 terminating in bearing members 15. The portions 12 of the supporting members 13 are rotatably mounted within suitable brackets 16 secured upon the sides A of the frame. By this construction it will be seen that the supports 10 may be tilted forwardly upon the pivots 11 and that the supporting members 13 may be rocked in a horizontal plane by virtue of the engagement of the horizontal portions 12 within the bearings 16. Extending between the lowermost portions 14 of the supporting members 13 is a shaft 17 which has its ends formed round and rotatably mounted within the bearings 15 provided at the lower ends of the portions 14 of the supporting members and which has its portion between the bearings 15 formed square in cross section.

Secured centrally upon the shaft 17 is a spool shaped casting 18 about which are engaged members 19 secured together by suitable bolts 20. The upper member 19 has formed thereon a plate 21 extending forwardly of the automobile and provided with a transversely extending slot 22 of appreciable length. Secured upon the steering arm connecting rod D is a sleeve 23 held in place by a suitable set screw 24 and having formed thereon a vertically extending arm 25 extending through the slot 22. Secured at the forward corners of the plate 21 are coil springs 26 which are in turn connected at their other ends with suitable screws or the like 27 provided at the lower ends of the vertical forward portions 12 of the supporting members 13.

In the operation of the device up to this point, it will be seen that when the automobile is steered to either side and the steering arm connecting rod D accordingly moved, the engagement of the vertical arm 25 with the ends of the slot 22 will cause the plate 21 and consequently the members 19 and spool member 18 to be moved, carrying with them the shaft 17 which will result in pivotal movement of the supporting members 13 within the bearings 16. The head lights E will then be correspondingly moved so that they will direct rays of light onto the roadway in advance of the vehicle. The springs 26 are for the purpose of returning the parts to their normal positions when the automobile is again steered in a straight line. The arm 25 has formed thereon a shoulder 28 engaging against the underside of the plate 21 for preventing the plate from rocking downwardly. It will be noted that the slot 22 is of considerably greater length than the width of the arm 25 so that when an automobile is traveling over a rough road the front wheels may follow the ruts without causing the swinging of the head lights, as a certain amount of lost motion is permitted.

In order that the head lights may be tilted forwardly upon their pivots 11, we provide, secured upon the floor boards B, a supporting member 30 upon which is pivoted a pedal 31. Secured upon the ends of the shaft 17 are crank members 32 to one of which is pivotally connected a rod 33 connected with the rear edge of the pedal 31. Also pivotally connected with the crank members 32 are rods 34 which extend forwardly and are pivotally connected at their ends with levers 35 pivoted at 36, upon the supporting members 13. Other rods 37 are pivotally connected with these levers 35 and extend upwardly and are connected with members 38 extending laterally beyond the rear sides of the members 10 above the pivots 11. When the driver of the vehicle wishes to tilt the head lights forwardly to avoid blinding the driver of an approaching car, it is necessary that he place either foot upon the pedal 31 and press thereon so that the rear edge thereof will be moved downwardly, and this movement will result in downward movement of the associated rod 33, forward and upward tilting of the crank member 32, forward and upward movement of the lever 35, vertical upward movement of the rod 37, and forward tilting of the member 11 carrying the lamp. When it is desired to restore the head lights to their normal positions, it is merely necessary that the operator so move his foot as to return the previously moved pedal to its normal position.

From the foregoing description and a study of the drawings it will be apparent that we have thus provided a comparatively simple and inexpensive device whereby the head lights of an automobile will be automatically caused to turn as the front wheels are turned in order that the light will follow the road, and in which means is provided for tilting the head lights downwardly.

While we have shown and described the preferred embodiment of our invention, it is of course to be understood that we reserve the right to make such changes in the form, construction, and arrangement of parts as will not depart from the spirit of the invention or the scope of the subjoined claims.

Having thus described our invention, we claim:—

1. A device of the character described comprising a pair of supporting members having their forward ends provided with upwardly extending vertical portions journaled upon the frame bars of an automobile, head lights connected with the upper ends of said vertical arms, a shaft connected with the rear ends of said supporting members, a member secured upon said shaft and including a forwardly extending plate disposed horizontally and provided with a transverse slot, a sleeve secured upon the steering arm connecting rod of the automobile, a vertically extending arm carried by said sleeve and disposed within said slot whereby upon longitudinal movement of said connecting rod during steering of the automobile said supporting members will be swung, resulting in corresponding movement of said head lights, and a pair of equalizing springs connected with the forward corners of said plate and with the forward extremities of said supporting members.

2. A device of the character described comprising supporting members carried by the frame of an automobile, vertically extending standards pivotally connected with said supporting members and carrying head lights, a pedal pivoted in the automobile in convenient reach of the driver, crank members connected with said supporting members, a rod connected with one of said crank members and with said pedal, levers pivoted upon said supporting members, rods connected with said crank members and said levers, lateral members secured on said standards and projecting rearwardly therebeyond, and rods connected with said levers and said last named members.

In testimony whereof we affix our signatures.

STANLEY E. JACOBY.
CLELAND J. EDMONDS.